(12) United States Patent
Izmirliev et al.

(10) Patent No.: US 12,314,413 B2
(45) Date of Patent: May 27, 2025

(54) SYSTEMS, METHODS, AND APPARATUSES FOR SELF-INTERROGATING DATA AND CORRECTING DATA STORAGE IMPLEMENTATIONS IN AN ELECTRONIC NETWORK

(71) Applicant: BANK OF AMERICA CORPORATION, Charlotte, NC (US)

(72) Inventors: Antoan Fotev Izmirliev, London (GB); Manu Jacob Kurian, Dallas, TX (US); Albena Noveva Fairchild, Indian Trail, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 191 days.

(21) Appl. No.: 18/096,378

(22) Filed: Jan. 12, 2023

(65) Prior Publication Data
US 2024/0241975 A1 Jul. 18, 2024

(51) Int. Cl.
G06F 21/62 (2013.01)
G06F 21/60 (2013.01)
G06F 21/78 (2013.01)

(52) U.S. Cl.
CPC ........ *G06F 21/6209* (2013.01); *G06F 21/602* (2013.01); *G06F 21/78* (2013.01)

(58) Field of Classification Search
CPC ..... G06F 21/6209; G06F 21/602; G06F 21/78
See application file for complete search history.

(56) References Cited

U.S. PATENT DOCUMENTS

| | | |
|---|---|---|
| 7,831,793 B2 | 11/2010 | Chakravarty |
| 7,877,362 B2 | 1/2011 | Gokhale |
| 8,285,685 B2 | 10/2012 | Prahlad |
| 8,612,439 B2 | 12/2013 | Prahlad |
| 9,262,498 B2 | 2/2016 | Ferris |
| 9,344,525 B2 | 5/2016 | de la Iglesia |
| 9,424,547 B2 | 8/2016 | Gazdzinski |
| 9,477,407 B1 | 10/2016 | Marshak |
| 9,811,543 B2 | 11/2017 | Morrison |
| 9,898,224 B1 | 2/2018 | Marshak |
| 10,042,564 B2 | 8/2018 | Motwani |
| 10,275,161 B2 | 4/2019 | Resch |
| 10,547,678 B2 | 1/2020 | Prahlad |
| 10,678,450 B2 | 6/2020 | Grube |

(Continued)

*Primary Examiner* — Michael Won
(74) *Attorney, Agent, or Firm* — Moore & Van Allen PLLC; Lauren M. Stokes (57) ABSTRACT

Systems, computer program products, and methods are described herein for self-interrogating data and correcting data storage implementations in an electronic network. The present disclosure is configured to identify at least one data storage component, wherein the at least one data storage component comprises data; determine at least one current requirement of the data; collect at least one current variable of the data; and determine whether the at least one current variable of the data matches the at least one current requirement of the data, wherein, in an instance where the at least one current variable of the data matches the at least one current requirement, store the data in the at least one data storage component, or wherein, in an instance where the at least one current variable of the data does not match the current requirement, generate at least one change variable for the data.

20 Claims, 5 Drawing Sheets

(56) References Cited

U.S. PATENT DOCUMENTS

| | | |
|---|---|---|
| 10,892,899 B2 | 1/2021 | Shelton, IV |
| 11,385,840 B2 | 7/2022 | Winarski |
| 11,416,179 B1 | 8/2022 | Grube |
| 2002/0104038 A1 | 8/2002 | Harmer |
| 2002/0152305 A1* | 10/2002 | Jackson ................. H04L 43/00 709/224 |
| 2007/0180490 A1* | 8/2007 | Renzi .................... G06F 21/604 726/1 |
| 2014/0212978 A1* | 7/2014 | Sharpe, Jr. ............. G01N 17/00 422/53 |
| 2014/0359276 A1* | 12/2014 | Resch ................. G06F 11/1004 713/153 |
| 2019/0138231 A1 | 5/2019 | Grube |
| 2019/0205776 A1* | 7/2019 | Kempf .................... H04L 43/06 |
| 2021/0064790 A1* | 3/2021 | Koelbl .................... G06F 21/78 |
| 2021/0174911 A1* | 6/2021 | Sharda ................ G06Q 10/103 |
| 2022/0050907 A1* | 2/2022 | Rognlie ............. G06F 21/6209 |
| 2022/0172206 A1 | 6/2022 | Cella |
| 2022/0368613 A1* | 11/2022 | Darji .................... G06F 9/5005 |
| 2023/0043702 A1* | 2/2023 | Sells ...................... G06Q 40/03 |
| 2023/0090556 A1* | 3/2023 | Wherry .................. H04L 9/321 713/193 |
| 2024/0264901 A1* | 8/2024 | Baptist .................. G06F 21/78 |

\* cited by examiner

SYSTEMS, METHODS, AND APPARATUSES FOR SELF-INTERROGATING DATA AND CORRECTING DATA STORAGE IMPLEMENTATIONS IN AN ELECTRONIC NETWORK

TECHNOLOGICAL FIELD

Example embodiments of the present disclosure relate to systems, methods, and apparatuses for self-interrogating data and correcting data storage implementations in an electronic network.

BACKGROUND

Managers of electronic networks may have a difficult time managing and correcting data in different data storage devices in an efficient, accurate, and a secure manner. For instance, managers of electronic networks may have a difficult time accurately tracking data and determining whether the data in different storage components or devices are valid, comply with particular requirements, are secure by particular means and/or requirements, and/or the like. Such issues are exacerbated when considering the processing power required to individually assess each data storage component by one processing component, let alone automatically making changes to the data where non-compliance is detected. Thus, there exists a need for a system which efficiently, accurately, and securely self-interrogates and corrects the data or the data storage components to be in compliance with certain requirements.

Applicant has identified a number of deficiencies and problems associated with self-interrogating data and correcting data storage implementations in an electronic network. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for self-interrogating data and correcting data storage implementations in an electronic network.

In one aspect, a system for self-interrogating and correcting data storage implementations is provided. In some embodiments, the system may comprise a memory device with computer-readable program code stored thereon; at least one processing device operatively coupled to the at least one memory device and the at least one communication device, wherein executing the computer-readable code is configured to cause the at least one processing device to: identify at least one data storage component, wherein the at least one data storage component comprises data; determine at least one current requirement of the data, wherein the at least one current requirement comprises at least one of a policy requirement, a regulatory requirement, an encryption requirement, or a validity requirement; collect at least one current variable of the data, wherein the at least one current variable comprises a policy variable, a regulatory variable, an encryption variable, or a validity variable; and determine whether the at least one current variable of the data matches the at least one current requirement of the data, wherein, in an instance where the at least one current variable of the data matches the at least one current requirement, store the data in the at least one data storage component, or wherein, in an instance where the at least one current variable of the data does not match the current requirement, generate at least one change variable for the data based on the current requirement.

In some embodiments, and in the instance where the at least one current variable of the data does not match the current requirement, the processing device is further configured to: apply the at least one change variable to the data; and generate, based on the at least one change variable applied to the data, updated data. In some embodiments, the updated data comprises the at least one change variable being embedded in the data. In some embodiments, the at least one change variable comprises a new data storage container identifier and wherein the updated data comprises a transmission of the data to a new data storage container associated with the new data storage container identifier. In some embodiments, the new data storage container is a secure data storage container for the updated data. In some embodiments, the updated data comprises a new structure of the data.

In some embodiments, the data storage component comprises at least one of data container or a cloud component.

In some embodiments, the data storage container comprises a data self-interrogation component, and wherein the data management component collects the at least one current variable of the data and generates the at least one change variable for the data.

In some embodiments, the at least one current requirement is determined at a predetermined interval, and wherein the at least one current variable of the data is collected at the predetermined interval.

In another aspect, a computer program product for self-interrogating and correcting data storage implementations is provided. In some embodiments, the computer program product comprises at least one non-transitory computer-readable medium having computer-readable program code portions embodied therein, the computer-readable program code portions which when executed by a processing device are configured to cause a processor to: identify at least one data storage component, wherein the at least one data storage component comprises data; determine at least one current requirement of the data, wherein the at least one current requirement comprises at least one of a policy requirement, a regulatory requirement, an encryption requirement, or a validity requirement; collect at least one current variable of the data, wherein the at least one current variable comprises a policy variable, a regulatory variable, an encryption variable, or a validity variable; and determine whether the at least one current variable of the data matches the at least one current requirement of the data, wherein, in an instance where the at least one current variable of the data matches the at least one current requirement, store the data in the at least one data storage component, or wherein, in an instance where the at least one current variable of the data does not match the current requirement, generate at least one change variable for the data based on the current requirement.

In some embodiments, and in the instance where the at least one current variable of the data does not match the current requirement, the processing device is further configured to: apply the at least one change variable to the data; and generate, based on the at least one change variable applied to the data, updated data. In some embodiments, the updated data comprises the at least one change variable being embedded in the data. In some embodiments, the at least one change variable comprises a new data storage container identifier and wherein the updated data comprises a transmission of the data to a new data storage container associated with the new data storage container identifier. In some embodiments, the new data storage container is a secure data storage container for the updated data. In some embodiments, the updated data comprises a new structure of the data.

In another aspect, a computer-implemented method for self-interrogating and correcting data storage implementations is provided. In some embodiments, the computer-implemented method may comprise: identifying at least one data storage component, wherein the at least one data storage component comprises data; determining at least one current requirement of the data, wherein the at least one current requirement comprises at least one of a policy requirement, a regulatory requirement, an encryption requirement, or a validity requirement; collecting at least one current variable of the data, wherein the at least one current variable comprises a policy variable, a regulatory variable, an encryption variable, or a validity variable; and determining whether the at least one current variable of the data matches the at least one current requirement of the data, wherein, in an instance where the at least one current variable of the data matches the at least one current requirement, store the data in the at least one data storage component, or wherein, in an instance where the at least one current variable of the data does not match the current requirement, generate at least one change variable for the data based on the current requirement.

In some embodiments, and in the instance where the at least one current variable of the data does not match the current requirement, the processing device is further configured to: applying the at least one change variable to the data; and generating, based on the at least one change variable applied to the data, updated data. In some embodiments, the updated data comprises the at least one change variable being embedded in the data. In some embodiments, the at least one change variable comprises a new data storage container identifier and wherein the updated data comprises a transmission of the data to a new data storage container associated with the new data storage container identifier. In some embodiments, the new data storage container is a secure data storage container for the updated data.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, there exists a need for a system to broadly, efficiently, accurately, and securely self-interrogate data in data storage components and to correct the data and/or the data storage component to be in compliance with certain requirements. For instance, such problems may arise for managers of electronic networks that manage and/or control different data storage components (e.g., data storage containers, cloud computing devices, and/or the like) which all comprise data. Such data may need to be periodically (at intervals) be interrogated to determine whether the data meets certain requirements and then to correct any data that does not meet such requirements. A need, therefore exists for a data self-interrogation component or data self-interrogation system to interrogate data at each data storage component it is associated with (e.g., there may be a particular data self-interrogation component for each data storage component) which will determine compliance or non-compliance of data and generate change variables for the data when non-compliance is detected.

Accordingly, the present disclosure works by identifying at least one data storage component, wherein the at least one data storage component comprises data and determining at least one current requirement of the data, wherein the at least one current requirement comprises at least one of a policy requirement, a regulatory requirement, an encryption requirement, or a validity requirement. The disclosure may further work by collecting at least one current variable of the data, wherein the at least one current variable comprises a policy variable, a regulatory variable, an encryption variable, or a validity variable; and determining whether the at least one current variable of the data matches the at least one current requirement of the data, wherein that, in an instance where the at least one current variable of the data matches the at least one current requirement, store the data in the at least one data storage component, or wherein, in an instance where the at least one current variable of the data does not match the current requirement, generate at least one change variable for the data based on the current requirement.

What is more, the present disclosure provides a technical solution to a technical problem. As described herein, the technical problem includes the broad, efficient, accurate, and secure determination of whether data meets certain current requirements in data storage components and automatically updating the data where compliance is not met. The technical solution presented herein allows for the broad, efficient, accurate, and secure determination of whether data meets certain requirements by determining at least one current requirement of the data, collecting at least one current variable of the data of the same type as the at least one current requirement and determining whether the at least one current variable matches the at least one current requirement, where such a determination will be used to determine whether the data is in compliance. Further, the technical solution provides for the generation of a change variable to be applied to the data where non-compliance is determined and such a change variable may be used to update the data to bring it into compliance with the at least one current requirement, automatically. In particular, the data self-interrogation system is an improvement over existing solutions to the broad, efficient, accurate, and secure interrogation of data and correction of data, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
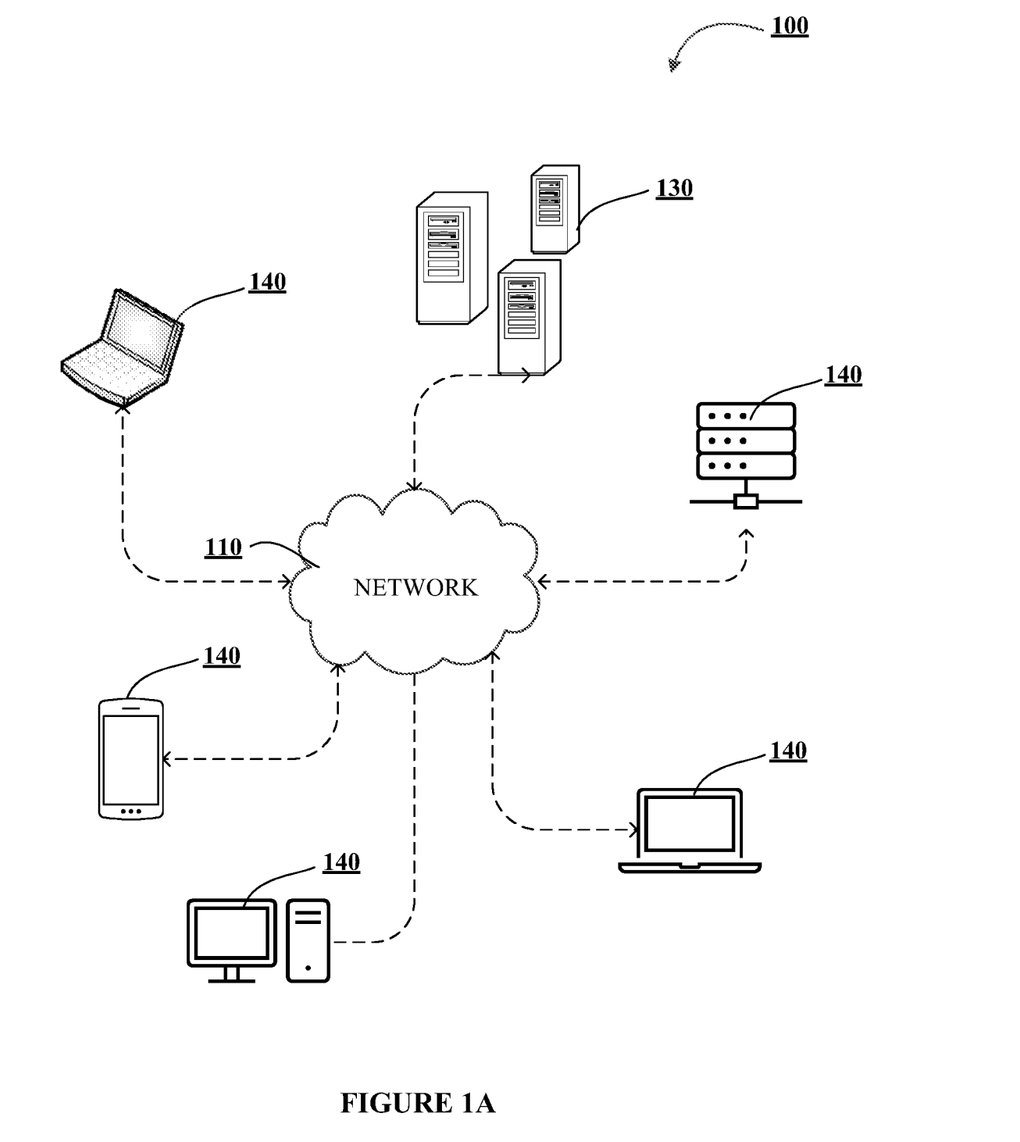
FIGS. 1A-1C illustrates technical components of an exemplary distributed computing environment for self-interrogating data and correcting data storage implementations in an electronic network, in accordance with an embodiment of the disclosure.
Figure 1B:
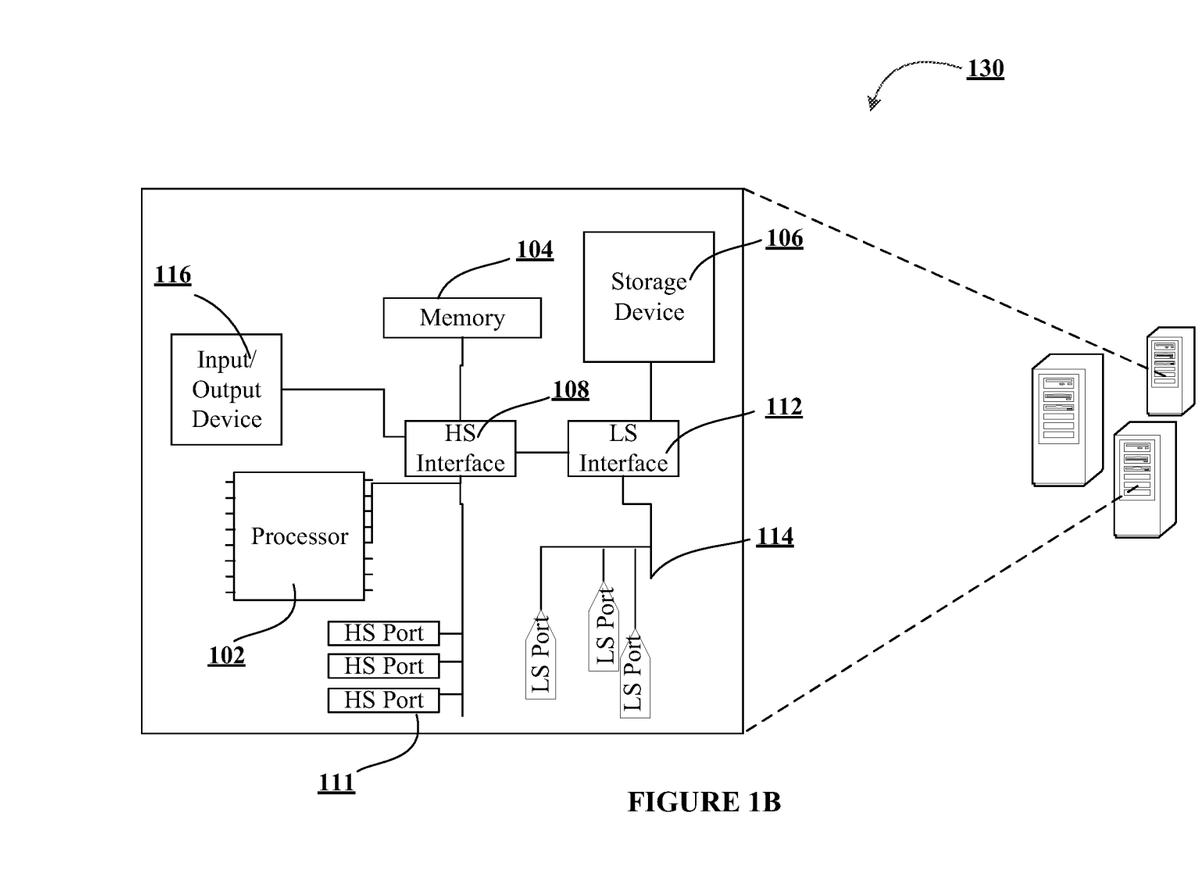
Figure 1C:
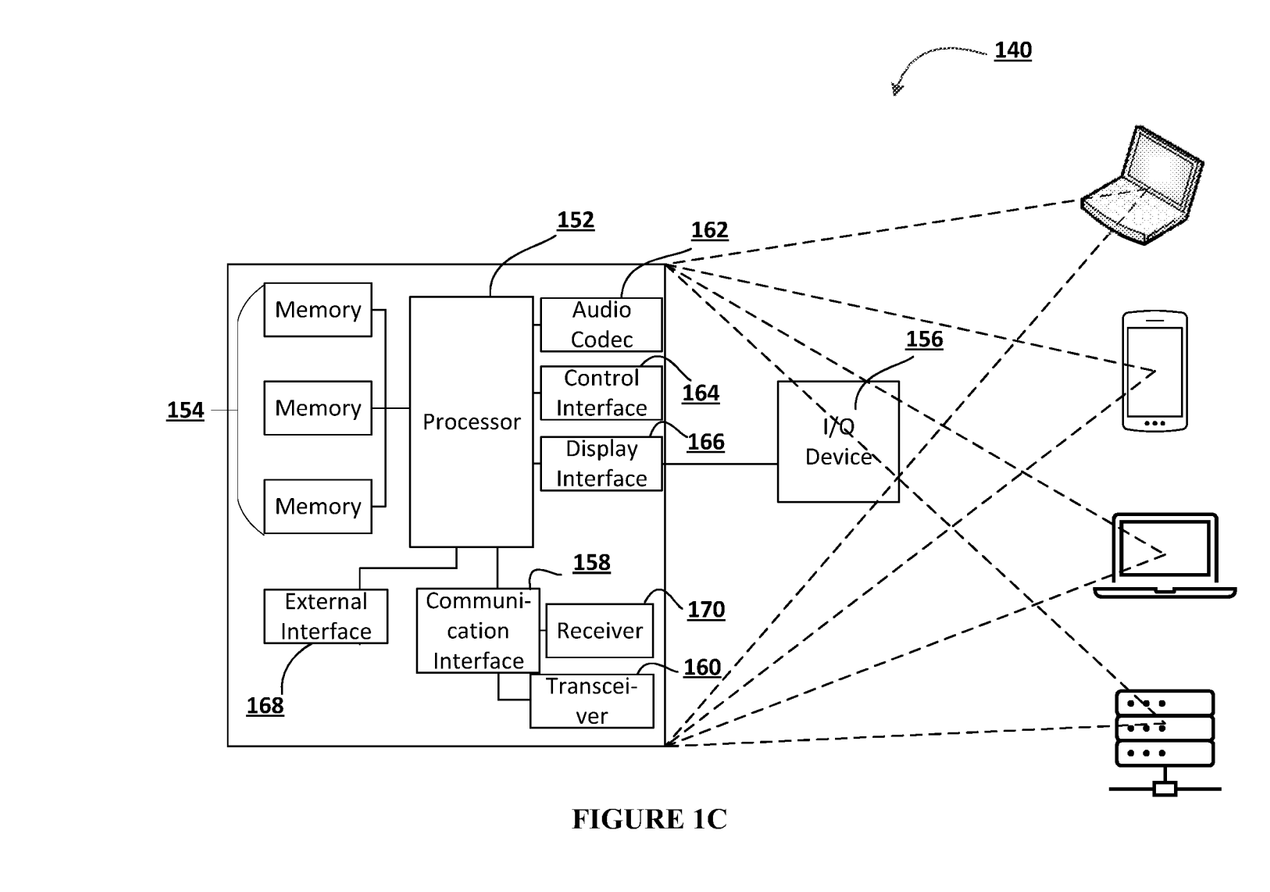

FIGS. 1A-1C illustrate technical components of an exemplary distributed computing environment for self-interrogating data and correcting data storage implementations in an electronic network 100, in accordance with an embodiment of the invention. As shown in FIG. 1A, the distributed computing environment 100 contemplated herein may include a system 130 (i.e., a data self-interrogation system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
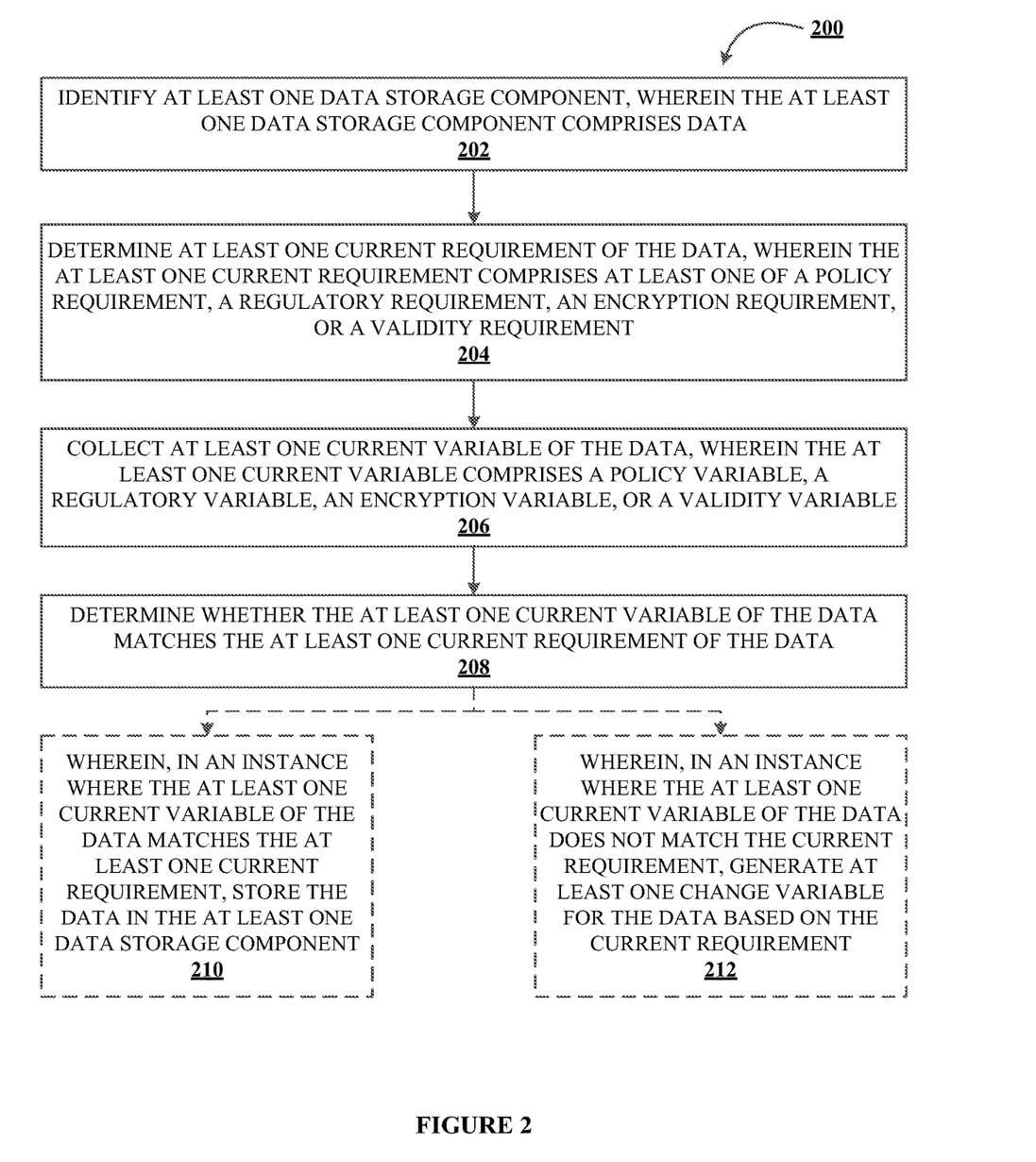
FIG. 2 illustrates a process flow for self-interrogating data and correcting data storage implementations in an electronic network, in accordance with an embodiment of the disclosure.

FIG. 2 illustrates a process flow 200 for self-interrogating data and correcting data storage implementations in an electronic network, in accordance with an embodiment of the invention. In some embodiments, a system (e.g., similar to one or more of the systems described herein with respect to FIGS. 1A-1C) may perform one or more of the steps of process flow 200. For example, a data self-interrogation system (e.g., the system 130 described herein with respect to FIG. 1A-1C) may perform the steps of process 200.

As shown in block 202, the process flow 200 may include the step of identifying at least one data storage component, wherein the at least one data storage component comprises data. In some embodiments, the data self-interrogation system may identify at least one data storage component from a plurality of data storage components the data self-interrogation system has access to or is associated with. For instance, and where a plurality of data storage components belong to a client of the data self-interrogation system, the data self-interrogation system may have access to the plurality of data storage components all owned and operated by the client and/or at least the data storage components that the client has allowed the data self-interrogation system to access for management purposes.

In some embodiments, the data self-interrogation system may identify a particular data storage component based on receiving a data storage component identifier from the client that owns and operates the data storage component and where the client may seek to determine whether the data stored in the data storage component is valid and does not need to be changed and/or updated.

In some embodiments, the data self-interrogation system itself may identify the at least one data storage component based on a listing of a plurality of data storage components that should be assessed or analyzed at a particular interval. For instance, the data self-interrogation system may access a listing of all the data storage components that should be interrogated in a particular order and/or at particular times, such as at predetermined intervals. Such a particular order, particular time(s), and/or predetermined interval(s) may be determined by the client of the data self-interrogation system, the data self-interrogation system itself, and/or based on the data stored in the data storage component. For instance, and where the data in the data storage component has not been interrogated for a long period (e.g., within the last week, within the last month, within the last year, and/or the like), the data self-interrogation system may determine the particular data storage component storing the data should be interrogated next.

In some embodiments, the data storage component may comprise at least one data container, cloud component (e.g., cloud storage), and/or the like.

In some embodiments, the at least one data storage container (and/or each of the plurality of data storage components) may comprise a data self-interrogation component which is configured to interrogate the associated data storage component. In this manner, the data self-interrogation component may self-interrogate the data storage component it is stored in and/or attached to. For instance, and in some embodiments, the data self-interrogation component may self-interrogate the data storage component and collect the at least one current variable of the data stored in the data storage component. Such a current variable may comprise a current attribute or trait of the data, which may comprise but is not limited to a policy variable, a regulatory variable, an encryption variable, a validity variable, and/or the like. Such variables are discussed in further detail below with respect to block 206. In some embodiments and based on the current variable and the current requirement (also discussed in further detail below), the data self-interrogation component may generate at least one change variable for the data, which is discussed in further detail below with respect to block 212 and FIG. 3.

As shown in block 204, the process flow 200 may include the step of determining at least one current requirement of the data, wherein the at least one current requirement comprises at least one of a policy requirement, a regulatory requirement, an encryption requirement, or a validity requirement. In some embodiments, the data self-interrogation system may determine at least one current requirement of the data which may be based on at least one of a client-supplied requirement (e.g., a requirement the data be encrypted and/or the data comprise a valid encryption that cannot be tampered with based on current cryptography attack methods); a data self-interrogation system-supplied requirement (e.g., the data self-interrogation system may comprise list of policies to abide by based on the type of data stored in the data storage component); and/or the like.

In some embodiments, each of the requirements collected may comprise at least one of a policy requirement (e.g., a data governance policy, a data protection policy, a data quality policy, data integration policy, a data standard policy, a data strategy policy, and/or the like) which may be client-supplied and/or data self-interrogation system-supplied based on the particular type of data in the data storage component; a regulatory requirement (e.g., requirements set forth by a governing entity such as requirements set forth by laws and/or requirements set forth by agencies, and/or the like); an encryption requirement (e.g., a requirement to update encryption on data that may be cryptographically attacked based on current cryptographic attack methods, a requirement that certain data be encrypted such as personally identifiable information or confidential information, and/or the like); a validity requirement (e.g., a data type requirement, a data code requirement, a range requirement for the data, a format requirement for the data, a consistency requirement for the data, a uniqueness requirement for the data, and/or the like); and/or the like.

In some embodiments, the data self-interrogation system may determine the current requirement(s) of the data at a predetermined intervals which may be set by the data self-interrogation system itself, by a client of the data self-interrogation system, and/or the like.

As shown in block 206, the process flow 200 may include the step of collecting at least one current variable of the data, wherein the at least one current variable comprises a policy variable, a regulatory variable, an encryption variable, or a validity variable. In some embodiments, the data self-interrogation system may determine and/or collect at least one current variable for the data in the data storage component. Such a current variable may refer to the current attribute and/or trait of the data, which may be compared against the at least one current requirement of the data. In this manner, the current variable may comprise similar data to the current requirements listed above.

For instance, the data self-interrogation system (e.g., via the data self-interrogation component) may collect and/or determine at least one of a current variable for the data of the data storage component, where the current variable may comprise at least one of a policy variable (e.g., a current data governance policy of the data, a current data protection policy of the data, a current data quality policy of the data, a current data integration policy of the data, a current data standard policy of the data, a current data strategy policy of the data, and/or the like); a regulatory variable (e.g., a current requirement(s) set forth by a governing entity such as requirements set forth by laws and/or requirements set forth by agencies which the data currently comprises and abides by, and/or the like); an encryption variable (e.g., a current encryption on data, a current determination that there is no encryption on the data, a current type of encryption on the data, and/or the like); a validity variable (e.g., a current data type of the data, a current data code of the data, a current range of the data, a current format of the data, a current consistency of the data, a current uniqueness of the data, and/or the like); and/or the like.

In some embodiments, the data self-interrogation system may collect and/or determine (e.g., by the data self-interrogation component) the at least one current variable of the data at a predetermined interval and/or at interval periods, like those described previously.

As shown in block 208, the process flow 200 may include the step of determining whether the at least one current variable of the data matches the at least one current requirement of the data. In some embodiments, the data self-interrogation system may determine whether the at least one current variable of the data matches the at least current requirement of the data by comparing the current requirement of a particular type such as the policy, regulatory, encryption, or validity against the current variable of the same type (e.g., where the current requirement is a policy requirement, the data self-interrogation system (data self-interrogation component) may determine and/or collect the current variable that is the policy variable to compare against the policy requirement). In this manner, and where the current requirement (e.g., policy requirement) does not match the current variable (e.g., policy variable) of the data (e.g., the current requirement requires the data have a particular current data protection policy, but the current variable shows the data has a previous version of the data protection policy of the particular current data protection policy), the data self-interrogation system may determine the data should be updated. Such embodiments of whether the at least one current variable of the data matches the at least one current requirement is described in further detail below.

In some embodiments, the data self-interrogation system (by the data self-interrogation component) may compare each of the current requirements (e.g., all of the policy requirement(s), the regulatory requirement(s), the encryption requirement(s), and the validity requirement(s) of the data) against the current variables of the data (e.g., all of the policy variable(s), the regulatory variable(s), the encryption variable(s), and the validity variable(s)) to determine whether any of the current variables do not match the current requirements. In those embodiments where there is at least one current variable that does not match the current requirement, the data self-interrogation system may determine the data should be updated to be in compliance with the current requirement.

In some embodiments, and as shown in block 210, the process flow 200 may include the step of storing, in an instance where the at least one current variable of the data matches the at least one current requirement, the data in at least one data storage component. In some embodiments, and where the data self-interrogation system (the data self-interrogation component) has determined the at least one current variable does match the at least one current requirement (or where all the current variables do match all the current requirements), the data self-interrogation system may continue to store the data in the current data storage component as the data is. For instance, the data may remain unchanged until a next interval period where the data self-interrogation system (the data self-interrogation component) determines at least one current variable does not match the at least one current requirement.

In some embodiments, and as shown in block 212, the process flow 200 may include the step of generating, in an instance where the at least one current variable of the data does not match the current requirement, at least one change variable for the data based on the current requirement. In some embodiments, and where the data self-interrogation system (the data self-interrogation component) has determined the at least one current variable does not match the at least one current requirement (where at least one current variable does not match a current requirement for the data), the data self-interrogation system may generate at least one change variable for the data which may be applied to the data in the current data storage component. Such a change variable may be based on the at least one current requirement that has not been met by the current variable, where the change variable may be used to bring the data in compliance with the current requirement.

For instance, the data self-interrogation system (the data self-interrogation component) may generate a change variable which may be applied to the data in its current state with an update to change the policy of the data (e.g., change the data governance policy of the data, change the data protection policy of the data, change the data quality policy of the data, change the data integration policy of the data, change the data standard policy of the data, change the data strategy policy of the data, and/or the like); change the regulatory variable of the data (e.g., change the requirement(s) which the data currently comprises and/or abides by, and/or the like); change the encryption variable of the data (e.g., change the encryption of the data, add encryption to the data, change the type of encryption of the data, and/or the like); change the validity variable of the data (e.g., change the data type of the data, change the data code of the data, change the range of the data, change the current format of the data, change the consistency of the data, change the uniqueness of the data, and/or the like); and/or the like.

Figure 3:
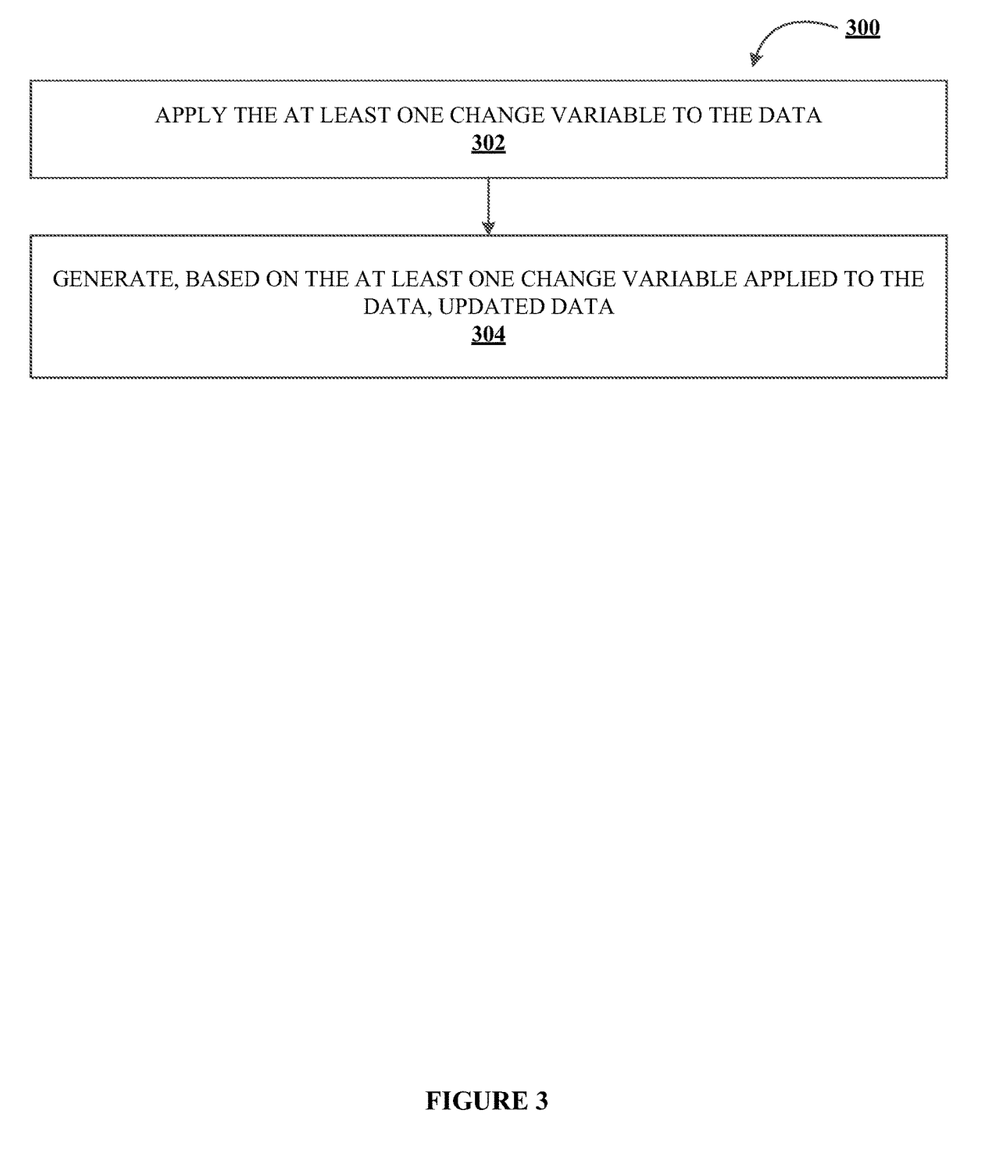
FIG. 3 illustrates a process flow for generating updated data, in accordance with an embodiment of the disclosure.

FIG. 3 illustrates a process flow 300 for generating updated data, in accordance with an embodiment of the invention. In some embodiments, a system (e.g., similar to one or more of the systems described herein with respect to FIGS. 1A-1C) may perform one or more of the steps of process flow 300. For example, a data self-interrogation system (e.g., the system 130 described herein with respect to FIG. 1A-1C) may perform the steps of process 300.

As shown in block 302, the process flow 300 may include the step of applying the at least one change variable to the data. In some embodiments, the data self-interrogation system may apply the at least one change variable of block 212 to the data in order to update the data to be in compliance with the at least one current requirement.

As shown in block 304, the process flow 300 may include the step of generating, based on the at least one change variable applied to the data, updated data. In some embodiments, the data self-interrogation system may generate the updated data by applying the at least one change variable (or a plurality of change variables if there are a plurality of current variables that do not match a plurality of current requirements). In some embodiments, the updated data may be based on embedding the at least one change variable in the data.

In some embodiments, the at least one change variable may comprise a new data storage container identifier, which the data self-interrogation system (data self-interrogation component) may use as a recipient location for a transmission of the data. For instance, the data self-interrogation system (data self-interrogation component) may receive the new data storage container identifier based on the at least one current requirement, which may require the data to be moved or transmitted to a new data storage component (e.g., a cloud computing component, a data container, and/or the like). In some embodiments, the new data storage container may be a secure data storage container for the updated data, such as a new data storage container comprising a most-recent encryption technique that cannot be attacked by new cryptographic techniques, such as new spray attacks and/or strategic cryptographic attacks.

In some embodiments, the updated data may comprise a new structure of the data, such as a new format, a script version, and/or the like. In some embodiments, the new structure of the data may comprise a plurality of previous data that was previously stored in the data storage component and/or a plurality of data storage components and may now be combined in a new structure.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for self-interrogating and correcting data storage implementations, the system comprising:
   a memory device with computer-readable program code stored thereon;
   at least one processing device operatively coupled to the at least one memory device and the at least one communication device, wherein executing the computer-readable code is configured to cause the at least one processing device to:
   identify at least one data storage component, wherein the at least one data storage component comprises data and comprises a data self-interrogation component;
   determine at least one current requirement of the data, wherein the at least one current requirement comprises at least one of a policy requirement, a regulatory requirement, an encryption requirement, or a validity requirement;

collect, by the data self-interrogation component stored in the data storage component, at least one current variable of the data, wherein the at least one current variable comprises a policy variable, a regulatory variable, an encryption variable, or a validity variable; and determine, by the data self-interrogation component, whether the at least one current variable of the data matches the at least one current requirement of the data, wherein, in an instance where the at least one current variable of the data matches the at least one current requirement, store the data in the at least one data storage component, or wherein, in an instance where the at least one current variable of the data does not match the current requirement, generate at least one change variable for the data based on the current requirement.

2. The system of claim 1, wherein, in the instance where the at least one current variable of the data does not match the current requirement, the processing device is further configured to:

apply the at least one change variable to the data; and
generate, based on the at least one change variable applied to the data, updated data.

3. They system of claim 2, wherein the updated data comprises the at least one change variable being embedded in the data.

4. The system of claim 2, wherein the at least one change variable comprises a new data storage container identifier and wherein the updated data comprises a transmission of the data to a new data storage container associated with the new data storage container identifier.

5. The system of claim 4, wherein the new data storage container is a secure data storage container for the updated data.

6. The system of claim 2, wherein the updated data comprises a new structure of the data.

7. The system of claim 1, wherein the data storage component comprises at least one of data container or a cloud component.

8. The system of claim 1, wherein the data storage component comprises a data self-interrogation component, and wherein the data self-interrogation component collects the at least one current variable of the data and generates the at least one change variable for the data.

9. The system of claim 1, wherein the at least one current requirement is determined at a predetermined interval, and wherein the at least one current variable of the data is collected at the predetermined interval.

10. A computer program product for self-interrogating and correcting data storage implementations, wherein the computer program product comprises at least one non-transitory computer-readable medium having computer-readable program code portions embodied therein, the computer-readable program code portions which when executed by a processing device are configured to cause a processor to:

identify at least one data storage component, wherein the at least one data storage component comprises data and comprises a data self-interrogation component;

determine at least one current requirement of the data, wherein the at least one current requirement comprises at least one of a policy requirement, a regulatory requirement, an encryption requirement, or a validity requirement;

collect, by the data self-interrogation component stored in the data storage component, at least one current variable of the data, wherein the at least one current variable comprises a policy variable, a regulatory variable, an encryption variable, or a validity variable; and determine, by the data self-interrogation component, whether the at least one current variable of the data matches the at least one current requirement of the data, wherein, in an instance where the at least one current variable of the data matches the at least one current requirement, store the data in the at least one data storage component, or wherein, in an instance where the at least one current variable of the data does not match the current requirement, generate at least one change variable for the data based on the current requirement.

11. The computer program product of claim 10, wherein, in the instance where the at least one current variable of the data does not match the current requirement, the processing device is further configured to:

apply the at least one change variable to the data; and
generate, based on the at least one change variable applied to the data, updated data.

12. The computer program product of claim 11, wherein the updated data comprises the at least one change variable being embedded in the data.

13. The computer program product of claim 11, wherein the at least one change variable comprises a new data storage container identifier and wherein the updated data comprises a transmission of the data to a new data storage container associated with the new data storage container identifier.

14. The computer program product of claim 13, wherein the new data storage container is a secure data storage container for the updated data.

15. The computer program product of claim 11, wherein the updated data comprises a new structure of the data.

16. A computer-implemented method for self-interrogating and correcting data storage implementations, the computer-implemented method comprising:

identifying at least one data storage component, wherein the at least one data storage component comprises data and comprises a data self-interrogation component;

determining at least one current requirement of the data, wherein the at least one current requirement comprises at least one of a policy requirement, a regulatory requirement, an encryption requirement, or a validity requirement;

collecting, by the data self-interrogation component stored in the data storage component, at least one current variable of the data, wherein the at least one current variable comprises a policy variable, a regulatory variable, an encryption variable, or a validity variable; and determining, by the data self-interrogation component, whether the at least one current variable of the data matches the at least one current requirement of the data, wherein, in an instance where the at least one current variable of the data matches the at least one current requirement, store the data in the at least one data storage component, or wherein, in an instance where the at least one current variable of the data does not match the current requirement, generate at least one change variable for the data based on the current requirement.

17. The computer-implemented method of claim 16, wherein, in the instance where the at least one current variable of the data does not match the current requirement, the processing device is further configured to:

applying the at least one change variable to the data; and generating, based on the at least one change variable applied to the data, updated data.

18. The computer-implemented method of claim 17, wherein the updated data comprises the at least one change variable being embedded in the data.

19. The computer-implemented method of claim 17, wherein the at least one change variable comprises a new data storage container identifier and wherein the updated data comprises a transmission of the data to a new data storage container associated with the new data storage container identifier.

20. The computer-implemented method of claim 19, wherein the new data storage container is a secure data storage container for the updated data.

* * * * *